United States Patent [19]

Maeda et al.

[11] Patent Number: 5,310,831
[45] Date of Patent: May 10, 1994

[54] PROCESS FOR PRODUCING A VINYL TERPOLYMER USING REACTORS ARRANGED IN SERIES

[75] Inventors: Katsuaki Maeda, Yokohama; Akihiro Watanabe, Tokyo; Hajime Nishihara, Yokohama, all of Japan

[73] Assignee: Asahi Kasei Kabushiki Kaisha, Osaka, Japan

[21] Appl. No.: 640,436

[22] PCT Filed: May 30, 1990

[86] PCT No.: PCT/JP90/00704
§ 371 Date: Jan. 30, 1991
§ 102(e) Date: Jan. 30, 1991

[87] PCT Pub. No.: WO90/15100
PCT Pub. Date: Dec. 13, 1990

[30] Foreign Application Priority Data

May 30, 1989 [JP] Japan .................................. 1-134568
Sep. 6, 1989 [JP] Japan .................................. 1-229207
Sep. 6, 1989 [JP] Japan .................................. 1-229325
Oct. 5, 1989 [JP] Japan .................................. 1-258925

[51] Int. Cl.$^5$ .......................... C08F 2/00; C08F 26/00
[52] U.S. Cl. .......................... 526/66; 526/72; 526/262
[58] Field of Search .......................... 526/66, 72, 262

[56] References Cited

U.S. PATENT DOCUMENTS

| 3,652,726 | 3/1972 | Nield | 360/876 |
|---|---|---|---|
| 4,877,833 | 10/1989 | Kondo et al. | 525/66 |
| 4,916,196 | 3/1990 | Aoki et al. | 526/81 |

FOREIGN PATENT DOCUMENTS 204548 12/1986 European Pat. Off.
59-135210 8/1984 Japan.
59-184243 10/1984 Japan.
60-79019 5/1985 Japan.
61-276807 12/1986 Japan.
62-207346 9/1987 Japan.
63-90515 4/1988 Japan.
63-90516 4/1988 Japan.
63-122746 5/1988 Japan.
63-162708 7/1988 Japan.

*Primary Examiner*—John Kight, III
*Assistant Examiner*—Jeffrey Culpeper Mullis
*Attorney, Agent, or Firm*—Armstrong, Westerman, Hattori, McLeland & Naughton

[57] ABSTRACT

This invention is directed to a thermoplastic terpolymer excelling in thermal stability and transparency and possessing high mechanical strength, specifically a thermoplastic copolymer (I) composed of 30 to 70% by weight of (A) an aromatic vinyl compound unit, 4 to 40% by weight of (B) a vinyl cyanide unit, and 26 to 50% by weight of (C) an N-substituted maleimide and characterized by having a narrow distribution of molecular weight divisions of copolymer composition as measured by GPC, having substantially no acetone-insoluble content, possessing a weight average molecular weight in the range of 100,000 to 300,000 and a number average molecular weight in the range of 50,000 to 150,000, and having a residual N-substituted maleimide content of not more than 50 ppm. It further concerns a method for efficient production of the thermoplastic copolymer and a thermoplastic resin composition containing the copolymer I, allowing manufacture of shaped articles excelling in thermal stability and resistance to chemicals and, at the same time, possessing high impact strength, and befitting materials for automobile interior parts and electrical and electronic parts.

1 Claim, No Drawings

PROCESS FOR PRODUCING A VINYL TERPOLYMER USING REACTORS ARRANGED IN SERIES

FIELD OF THE INVENTION

This invention relates to a terpolymer excelling in resistance to heat, mechanical strength, and transparency, a method for the production thereof, and a thermoplastic resin composition allowing manufacture of a shaped article excelling in resistance to heat and resistance to chemicals and possessing high impact strength.

BACKGROUND OF THE INVENTION

In recent years, in the fields of automobiles, office machines and tools, and electrical products, efforts are being made to convert parts especially made of sheet metal to those of resinous sheet for the purpose of lessening weight, lightening energy consumption, and reducing cost. As the result, such heat-resistant and impact-resistant resins such as alloys of polycarbonate and ABS resin and modified PPE have already found utility in various parts.

The styrene-acrylonitrile copolymer (AS resin) is a transparent thermoplastic resin excelling in resistance to chemicals and possessing high mechanical strength and exhibiting highly satisfactory compatibility as with the ABS resin and, therefore, has found extensive utility as a molding material. The resin composition using this copolymer, owing to its inferior resistance to heat, finds greatly limited utility in industrial applications.

As a way of improving the AS resin's resistance to heat, the incorporation of an α-methyl styrene unit and a maleic anhydride unit in the molecular chain has been known to the art, for example. In this case, however, the produced resin is not practicable because it is decomposed at high temperatures.

This resin has another disadvantage that the blow molding technique cannot be adopted for the manufacture of a large shaped article of the resin because the phenomenon of drawdown due to the pyrolytic property of α-methyl styrene occurs heavily.

As a way of alleviating the effect of the drawback of α-methyl styrene mentioned above, the idea of improving the AS resin's resistance to heat by having a N allyl maleimide unit into the molecular chain of the resin has been proposed (U.S Pat. No. 3,652,726, U.S. Pat. No. 3,766,142, Japanese Patent Publication No. 50,357/1987, and Japanese Patent Publication No. 34,961/1989).

The terpolymer of styrene, acrylonitrile, and N allyl maleimide obtained by this method, however, is not desirable because it has a markedly large composition distribution as a polymer, betrays conspicuous deficiency in such physical properties as resistance to heat and mechanical strength, and manifests slightly inferior transparency and, therefore, finds only limited utility in industrial applciations.

Further, the resin composition using this terpolymer has the problem of insufficient improvement in mechanical strength and resistance to heat distortion.

As a way of uniformizing the composition distribution of the terpolymer, it is known that the method of continuous solution polymerization can be advantageously resorted to. A method for producing the aforementioned terpolymer by the technique of continuous solution polymerization is disclosed in Japanese Patent Application Disclosure No. 276,807/1986. In the case of this method, though the produced terpolymer acquires uniform composition distribution as a polymer, it has no sufficiently improved resistance to heat. When phenyl maleimide is supplied in a large amount to the polymerization vessel for the purpose of heightening the resistance to heat, the reaction solution containing a large amount of maleimide induces a side reaction in a volatile component removing device and consequently gives rise to a fairly large amount of oligomer and the phenyl maleimide eventually persists in the produced terpolymer.

When the amount of the phenyl maleimide monomer persisting in the terpolymer exceeds 50 ppm, the monomer exudes from the terpolymer and passes into a neighboring substance such as a foodstuff and consequently entails a problem of toxicity. When the resin is used for molding a shaped article, the resin assumes a conspicuous color, discharges a viscous exudate, suffers from deficiency in resistance to heat, and finds only limited utility in industrial application.

In the conventional technique, when the volatile component removing device is operated under the conditions of high temperature and high vacuum for the purpose of decreasing the residual phenyl maleimide content, the operation of the device gives rise to a large amount of oligomer such that the produced terpolymer suffers from lack of uniform composition distribution as a polymer and the resin succumbs to thermal decomposition and thermal coloration.

The present inventors have continued a diligent study in search of a copolymer which concurrently satisfies the heretofore unattainable conditions of offering high resistance to heat, exhibiting a uniform composition distribution as a copolymer, and having a residual phenyl maleimide content of not more than 50 ppm and, what is more, excels in transparency. This invention has been perfected as the result.

The inventors have further continued this diligent study with a view to developing a thermoplastic resin having the copolymer as one component thereof and excelling in resistance to impact and resistance to heat, to find that a thermoplastic resin composition obtained by combining the aforementioned terpolymer and a specific thermoplastic copolymer in a specific ratio and a composite material obtained by incorporating glass fibers, glass flakes, or polycarbonate resin in the aforementioned terpolymer or composition satisfy the conditions mentioned above. This invention has been perfected as the result.

DISCLOSURE OF THE INVENTION

To be specific, this invention relates to:

(1) A thermoplastic copolymer (I) comprises 30 to 70% by weight of (A) an aromatic vinyl compound unit, 4 to 40% by weight of (B) a vinyl cyanide unit, and 26 to 50% by weight of (C) a N-substituted maleimide unit, which thermoplastic copolymer is characterized by having a narrow distribution of molecular weight divisions of copolymer composition as measured by GPC, having substantially no acetone-insoluble content, possessing a weight average molecular weight of not less than 100,000 and not more than 300,000, possessing a number average molecular weight of not less than 50,000 and not more than 150,000, and having a residual N-substituted maleimide monomer content of not more than 50 ppm in the copolymer, (2) A thermoplastic resin composition, comprising 30 to 70% by weight of (I) a thermoplastic copolymer and 70 to 30% by weight of (II) a thermoplastic copolymer consisting of 50 to 80% by weight of (A) an aromatic vinyl compound unit and 20 to 50% by weight of (B) a vinyl cyanide unit and possessing a weight average molecular weight of not less than 80,000 and not more than 300,000, (3) A thermoplastic resin composition, comprising 30 to 70% by weight of (I) a thermoplastic copolymer, 5 to 30% by weight of (II) a thermoplastic copolymer, and 25 to 45% by weight of (III) a thermoplastic copolymer formed of a copolymer obtained by copolymerizing 50 to 65% by weight of (A) an aromatic vinyl compound unit, 20 to 30% by weight of (B) a vinyl cyanide unit, and 10 to 30% by weight of (C) α-methyl styrene or 5 to 10% by weight of N-phenyl maleimide in the presence of 30 to 60 parts by weight of an acrylate type or a diene type rubber having a Tg of not more than 25° C., (4) A thermoplastic resin composition, comprising 30 to 70% by weight of (I) a thermoplastic copolymer, 5 to 30% by weight of (II) a thermoplastic copolymer, and 25 to 45% by wegiht of (IV)a thermoplastic copolymer formed of a copolymer obtained by copolymerizing 50 to 80 % by weight of (A) an aromatic vinyl compound and 20 to 50% by weight of (B) a vinyl cyanide unit in the presence of 30 to 60 parts by weight of an acrylate type or a diene type rubber having a Tg of not more than 25° C., and (5) A thermoplastic resin composition, comprising 30 to 70% by weight of (I) a copolymer, 25 to 45% by weight of (V) multilayer graft copolymer particles having an average particle diameter in the range of 0.2 to 0.8 μm and consisting of 30 to 80% by weight of (a) rubbery copolymer particles obtained by forming on the surface of rigid resin particles an acrylic ester type cross-linked polymer layer in a manner such that the gravimetric ratio of the particles to the polymer layer is in the range of 5:95 to 40:60, 10 to 30% by weight of (b) a rubbery elastic layer comprising 20 to 80% by weight of an acrylic ester unit, 5 to 75% by weight of an aromatic vinyl compound unit, and 5 to 50% by weight of a vinyl cyanide unit and formed by sequentially graft polymerizing the units mentioned above on the surface of the rubbery copolymer particles, and 10 to 40% by weight of (c) a resin layer comprising 30 to 90% by weight of an aroamtic vinyl compound unit, 10 to 50% by weight of a vinyl cyanide unit, and optionally not more than 20% by weight of an acrylic ester unit, and optionally incorporating further therein not more than 50% by weight of (II) a copolymer.

Now, the present invention will be described in detail below.

Copolymer I

The copolymer I of this invention is characterized by having a very narrow composition distribution as a copolymer. By an experiment which comprises dissolving a copolymer in tetrahydrofuran and dividing the resultant solution by GPC into fractions differing in molecular weight, the copolymer I of this ivnention is found to have a very narrow, substantially fixed composition distribution because the fractions of different molecular weights are uniform in composition, whereas the countertype copolymer of the conventional technique is found to have a very wide composition distribution because the fractions are variable in composition.

Owing to the uniformity of composition distribution, the produced copolymer excels in transparency, exhibits high resistance to heat distortion, and possesses highly satisfactory mechanical strength.

The term "copolymer composition distribution" as used herein refers to a property which is determined and defined as follows.

A sample copolymer about 100 mg in size is accurately weighed out in a 10-ml measuring flask and dissolved with THF to a stated total volume. A stated volume (100 μl) of the resultant solution is poured in a GPC device and assayed for determination of molecular weight distribution. When the chart registering the results of the measurement of molecular weight distribution begins to show a peak, the fractions of the eluate obtained in the successive 1-minute durations are placed severally in sample vials. The sample eluates in the vials are treated with a stated amount of KBr powder to expel the THF by vaporization and allow infrared absorption analysis by the diffusion reflection method.

The compositional ratios of the individual fractions can be found by the use of a calibration curve prepared in advance by plotting absorption intensities of CN group (2,237 $cm^{-1}$), C=O group (1,712 $cm^{-1}$), and benzene ring (760 $cm^{-1}$)

Definition of narrowness of composition distribution or uniformity

Composition distributions were obtained using infrared absorption analysis, as described above, to determine the amount of aromatic vinyl compound, vinyl cyanide and N-substituted maleimide in each fraction of the polymer which was separated by GPC as described above. At molecular weights of from 50,000–250,000, the composition distributions were narrow and uniform as determined by the equations $X=X'(1\pm0.20)$ % by weight, $Y=Y'(1\pm0.20)$ % by weight and $Z=Z'(1\pm0.20)$ % by weight. $X'$, $Y'$, and $Z'$ represent the content of styrene, acrylonitrile and n-phenylmaleimide components in the thermoplastic polymer. X, Y and Z represent the content of styrene, acrylonitrile and n-phenylmalemide in each fraction separated as described above, and $X+Y+Z=100$.

In other words, the composition distribution of the copolymer of this invention is required to have a deviation limited to within 20% from the average value thereof. If this deviation exceeds 20%, the transparent heat-resistant resin, i.e. an applied product of the copolymer I, suffers from various disadvantages such as impairment of transparency, occurrence of opacification with suspended particles, decline of mechanical strength, and restriction of utility in industrial applications.

The monomers which are usable for the formation of the (A) unit, namely, the aromatic vinyl compound unit, in the present invention include styrene, α-methyl styrene, o-methyl styrene, m-methyl styrene, p-methyl styrene, and chlorostyrene, for example. Among other monomers mentioned above, styrene proves to be particularly desirable. These aromatic vinyl compounds may be used either singly or in the form of a combination of two or more members.

The monomers which are usable for the formation of the (B) unit, i.e. a vinyl cyanide unit, in the copolymer of this invention include acrylonitrile and methacrylonitrile, for example. Acrylonitrile proves to be more desirable than methacrylonitrile. The vinyl cyanide compounds may be used either singly or in the form of a combination of two or more members.

The monomers which are usable for the formation of the (C) unit, i.e. an N-substituted maleimide unit, in the copolymer of this invention include N-methyl maleimide N-ethyl maleimide, N-butyl maleimide, N-phenyl maleimide, N-cyclohexyl maleimide, and N-chlorophenyl maleimide, for example. Among other monomers mentioned above, N-phenyl maleimide proves to be particularly desirable in terms of ability to enhance resistance to heat, ease of procurement, and economy. These N-substituted maleimides may be used either singly or in the form of a combination of two or more members.

The proprotions of the contents of the component units in the copolymer of this invention are required to be in the ranges of 30 to 70% by weight of the aromatic vinyl compound unit, 4 to 40% by weight of the vinyl cyanide unit, and 26 to 50% by weight of the N-substituted maleimide unit, preferably in the ranges of 35 to 60% by weight of the aromatic vinyl compound unit, 10 to 30% by weight of the vinyl cyanide unit, and 26 to 40% by weight of the N-substituted maleimide unit.

The copolymer is deficient in mechanical strength when the content of the aromatic vinyl compound unit is less than 30% by weight. It is deficient in resistance to heat if this content exceeds 70% by weight. The copolymer is deficient in mechanical strength if the content of the vinyl cyanide unit is less than 4% by weight. It tends to lose resistance to heat and undergo coloration by heating if the content exceeds 40% by weight. The copolymer fails to manifest fully the effect of the N-substituted maleimide in enhancing the resistance the copolymer to heat if the content of the N-substituted maleimide unit is less than 26% by weight. It is deficient in mechanical strength if this content exceeds 50% by weight.

The copolymer of this invention is required to possess a weight average molecular weight of not less than 100,000 and not more than 300,000 and a number average molecular weight of not less than 50,000 and not more than 150,000. The object of this invention is not fully attained if the weight average molecular weight and the number average molecular weight of this copolymer deviate from the respective ranges mentioned above.

The copolymer of this invention is further required to have substantially no acetone insoluble content. The term "acetone insoluble content" as used herein means the insoluble content which is found when a copolymer sample, 3 g in size, is dissolved in 27 g of acetone at a temperature of 25° C. When an alternate copolymer consisting of an aromatic vinyl compound and an N-substituted maleimide in a molar ratio of about 1:1 is dissolved in acetone under the conditions mentioned above, the acetone insoluble content is roughly 99% by weight. The fact that the copolymer of this invention has substantially no acetone insoluble content means that it contains substantially no alternate copolymer. When the copolymer contains an alternate copolymer, it is undesirable in that it is deficient in balance between resistance to heat and mechanical strength.

Further, in the copolymer of this invention, the unaltered N-substituted maleimide content is required to be not more than 50 ppm. If the residual N-substituted maleimide content exceeds 50 ppm, the produced copolymer has the disadvantage that it tends to show a low temperature of heat distortion and find only limited utility in food packaging materials.

For the production of the copolymer I of the present invention, the continuous bulk polymerization method, the continuous solution polymerization method, and the radical polymerization method, for example, can be adopted.

As a way of producing the copolymer I of this invention, the continuous solution polymerization method particularly of the type resorting to combined use of a complete mixing tank and a laminar flow reaction tank can be used particularly desirably for the sake of preventing the residual N-substituted maleimide monomer content in the copolymer from increasing past 50 ppm.

As regards the proportions of the component monomers to be used in the production of the copolymer I, it is necessary that the proportion of the aromatic vinyl compound should be in the range of 30 to 90% by weight, that of the vinyl cyanide compound in the range of 4 to 40% by weight, and that of N-substituted maleimide in the range of 5 to 50% by weight, and preferably the proportion of the aromatic vinyl compound is in the range of 40 to 80% by weight, that of the vinyl cyanide compound in the range of 10 to 30% by weight, and that of the N-substituted maleimide in the range of 10 to 40% by weight.

The solvents which are usable effectively herein are aromatic hydrocarbons, ketones, and alcohols. The solvents which are desirable include ethyl benzene, toluene, xylene, methylethyl ketone, butanol, and tetrahydrofuran, for example. These solvents may be used either singly or in the form of a combination of two or more members.

The radical initiator to be used for the polymerization need not be particularly limited but may be selected from among various radical initiators heretofore popularly used in the production of the AS resins. For example, organic peroxides and azo type compounds whose half-life periods are 10 hours at temperatures in the range of 70° to 120° C. are usable effectively as radical initiators. Specifically, t-butyl peroxyisopropyl carbonate, 1,1-bis(t-butylperoxy)-3,3,5-trimethylcyclohexane, and azoisobutylonitrile may be cited as desirable examples.

Optionally, during the course of the polymerization, the reaction system may incorporate therein known additives such as molecular weight adjusting agent, plasticizer, thermal stabilizer, antioxidant, and photostabilizer as occasion demands.

As a polymerizing device, this invention requires to use a complete mixing type reaction vessel and a laminar flow reaction vessel installed in series. By continuously supplying the component monomers, a solvent, a radical initiator, etc. in respectively required amounts to the polymerizing device, the desired copolymer can be continuously produced.

In the present invention, the conversion obtained in the aforementioned complete mixing type reaction vessel is required to exceed 30% by weight, desirably to exceed 40% by weight, and more desirably to fall in the range of 50 to 65% by weight. In the reaction solution which flows out of the complete mixing type reaction vessel, the composition of unaltered monomers is desired to be such that the aromatic vinyl compound accounts for a proportion in the range of 30 to 80% by weight, the vinyl cyanide compound for a proportion in the range of 10 to 50% by weight, and the N-substituted maleimide for a proportion of not more than 20% by weight, preferably not more than 15% by weight, respectively based on the total amount of the unaltered monomers.

Further, in the present invention, the conversion in the final laminar flow reaction vessel is required to be not less than 50% by weight, desirably not less than 60% by weight, and more desirably not less than 70% by weight. The difference between the conversion in the complete mixing type reaction vessel and the conversion in the final laminar flow reaction vessel is desired to be not less than 10% by weight.

The temperature of the polymerization reaction is generally selected in the range of 70° to 180° C. The temperature in the complete mixing type reaction vessel is desired to be in the range of 70° to 160° C. and that in the laminar flow reaction vessel in the range of 90° to 180° C. Preferably, the former temperature is desired to be in the range of 90° to 140° C. and the latter one in the range of 100° to 160° C. The retention time of the reactants in the laminar flow reaction vessel (inner volume of reaction vessel/volume of the supplied reactans) is generally not less than 0.5 hour, preferably not less than 1 hour.

If the conversion in the complete mixing type reaction vessel is less than 30% by weight, the reaction tends to form an alternating copolymer having the aromatic vinyl compound and the N-substituted maleimide in a molar ratio approximating 1:1. If the content of the unaltered N-substituted maleimide in the reaction solution flowing out of the complete mixing type reaction vessel exceeds 20% by weight based on the total of the unaltered monomers, the disadvantage arises that the laminar flow reaction vessel tends to form an alternating copolymer having the aromatic vinyl compound and the N-substituted maleimide in a molar ratio approximating 1:1.

If the conversion in the final laminar flow reaction vessel is less than 50% by weight, the possibility ensues that the content of the unaltered N-substituted maleimide in the copolymer to be produced will exceed 50 ppm.

Though the complete mixing type reaction vessel to be used in the present invention need not be limited to any particular construction, it is desired to be such that the polymerization product, the composition of the polymerization solution, and the temperature are equally retained at various parts of the interior of the reaction vessel. The laminar flow reaction vessel is not limited to any particular type but is desired to be such that the polymerization will proceed integrally.

Though the number of reaction vessels to be used in this invention is not particularly limited, the number of complete mixing type reaction vessels is desired to be 1 or 2 and that of laminar flow reaction vessels to be 1 to 3.

In the laminar flow reaction vessel, the amount of the aromatic vinyl compound to be used may be increased by a proportion of not more than 20% by weight, preferably not more than 15% by weight, based on the amount originally planned to be used. Particularly when the unaltered vinyl cyanide compound in the reaction solution supplied to the laminar flow reaction vessel exceeds 30% by weight based on the amount of the vinyl cyanide compound supplied to the polymerization, the additional use of the aromatic vinyl compound is advantageous in respect that it will allow the unaltered N-substituted maleimide content in the produced copolymer to be lowered below 50 ppm.

Now, the production of the copolymer of this invention by the method of continuos solution polymerization will be described below with reference to one preferred working example. A solution prepared by mixing 60 parts of styrene, 15 parts of acrylonitrile, and 25 parts of N-phenyl maleimide with a solvent which is optionally used and adding to the resultant solution a radical initiator such as an organic peroxide or an organic azo compound is continuously supplied to a polymerizing device and subjected to polymerization under conditions selected for thorough consumption of N-phenyl maleimide. In this case, the conditions for polymerization must be selected suitably lest the composition distribution should widen.

The polymerization temperature in the complete mixing reaction vessel is 11° C. and the conversion in this reaction vessel is 61%. The polymerization temperature in the first laminar flow reaction vessel is 100° C., 110° C., 110° C. To the upstream side of the second laminar flow reaction vessel, 10 parts of styrene is added. The final conversion of polymerization is 76% and the residual N-phenyl maleimide content is not more than 50 ppm.

Then, the polymer solution is continuously taken out and introduced into a high-temperature vacuum vessel to be purged of unaltered monomers and solvent. The resultant molten polymer, in conjunction with an antioxidant and a weathering agent selected from among hindered phenols, hindered amines, and behzotriazoles, is extruded, cooled, solidified, and finely divided to produce the resin of the present invention.

When this resin is produced by emulsion polymerization or suspension polymerization, it entails the disadvantage that the uniformity of the composition distribution of the copolymer I which characterizes the resin of this invention is impaired and the resin possesses inferior transparency and undergoes opacification with suspended particles and betrays conspicuous deficiency in resistance to chemicals and resistance to impacts.

The polymerization temperature is required to be in the range of 100° to 160° C., the temperature in the heating vacuum chamber in the range of 200° to 270° C., the vacuum degree in the range of 0.1 to 50 torrs, and the retention time in the range of 5 to 160 minutes.

For the sake of improving the resin composition in resistance to heat and in flowability, the content of the copolymer I in the resin composition is required to be in the range of 30 to 70% by weight.

Copolymer II

The copolymer II is a binary copolymer of an aromatic vinyl compound and vinyl cyanide and can be obtained by the conventional method.

The aromatic vinyl compounds which are usable for the copolymer II include styrene type monomers such as styrene, α-methyl styrene, vinyl toluene, t-butyl styrene, and chlorostyrene and derivatives thereof. Among other aromatic vinyl compounds mentioned above, styrene proves to be particularly desirable. The amount of the aromatic vinyl compound to be used is in the range of 50 to 80% by weight.

The vinyl cyanides which are usable herein include acrylonitrile and methacrylonitrile. Acrylonitrile proves to be more desirable than methacrylonitrile. The amount of the vinyl cyanide to be used is in the range of 20 to 60% by weight. The weight average molecular weight of the copolymer II is not less than 80,000 and not more than 300,000.

For the production of the copolymer II, the methods of continuous solution polymerization, suspension polymerization, emulison polymerization, etc. are usable. Among other methods mentioned above, the method of continuous solution polymerization proves to be particularly desirable.

For the sake of allowing improvement in resistance to heat and flowability, the amount of the copolymer II to be used is in the range of 30 to 70% by weight in the resin composition consisting of the copolymer I and the copolymer II or in the range of 5 to 30% by weight in the resin composition consisting of the copolymer I, the copolymer II, and the copolymer III or the copolymer IV.

Copolymers III and IV

The copolymers III and IV are each a component to be used as an agent for improving the resin composition in resistance to impacts. They can be produced by graft polymerizing an aromatic vinyl compound, a vinyl cyanide, and α-methyl styrene or N-phenyl maleimide (III) or an aromatic vinyl compound and a vinyl cyanide (IV) in the presence of an acrylate type or diene type rubber having a Tg of not more than 25° C. The rubbers having Tg's of not more than 25° C. and usable advantageously for the production of the copolymer include polymers formed mainly of butyl acrylate and 2-ethylhexyl acrylate and polymers obtained mainly by polymerizing butadiene and isoprene, for example. The amount of the rubber to be used herein is in the range of 30 to 60% by weight.

The aroamtic vinyl compounds which are usable herein include styrene type monomers such as styrene, α-methyl styrene, vinyl toluene, T-butyl styrene, and chlorostyrene and derivatives thereof. Among other aromatic vinyl compounds mentioned above, styrene proves to be particularly desirable. The amount of the aromatic vinyl compound to be used is in the range of 50 to 65% by weight in the case of the copolymer III or in the range of 50 to 80% by weight in the case of the copolymer IV.

The vinyl cyanides which are usable herein include acrylonitrile and methacrylonitrile, for example. Acrylonitrile proves to be more desirable than methacrylonitrile. The amount of the vinyl cyanide to be used is in the range of 20 to 30% by weight in the case of the copolymer III or in the range of 20 to 50% by weight in the case of the copolymer IV.

In the copolymer III, α-methyl styrene or N-phenyl maleimide is used. The amounts of α-methyl styrene and N-phenyl maleimide to be advantageously used herein are respectively in the range of 10 to 30% by weight and in the range of 5 to 10% by weight.

For the production of the copolymers III, IV, the method of emulsion polymerization or continuous solution polymerization can be used.

By heightening the Tg of the graft layer of graft rubber concentration of the copolymer III owing to the use of α-methyl styrene or N-phenyl maleimide, the effect of the discoloration, a defect inherent in the product of the conventional injection molding technique, is conspicuously alleviated. In the case of the resin composition of the present invention, the product of injection molding of the resin composition is not discolored even in an atmosphere heated to 110° C. and, therefore, poses absolutely no problem from the point of view of practical use.

The amounts of the copolymer III or the copolymer IV to be used in the resin composition consisting of the copolymer I, the copolymer II, and the copolymer III or the copolymer IV is required to be in the range of 25 to 45% by weight for the sake of improving the produced resin composition in resistance to heat and flowability.

Multilayer graft copolymer particles V

The multilayer graft copolymer particles each comprise (a) a rubbery copolymer particle having an acrylic ester type cross-linked polymer layer (second layer) formed on the surface of a rigid resin particle (first layer) and (b) a rubbery elastomer layer (third layer) and (c) a resin layer (fourth layer) sequentially superposed by graft polymerization on the surface of the rubbery copolymer particle. These component layers of the multilayer graft copolymer particles severally possess an important function to discharge.

First, the rigid resin layer which forms the innermost layer is important for the purpose of heightening the modulus of elasticity of the rubbery copolymer and further in the sense of deciding the final particle diameter of the multilayer graft copolymer in seed polymerization. The ratio of the contents of the rigid resin layer as the first layer and the acrylic ester type cross-linked polymer layer as the second layer in the rubbery copolymer particles consisting of the first and second layers is required gravimetrically to be in the range of 5:95 to 40:60. The effect in heightening the modulus of elasticity is not fully manifested if the proportion of the rigid resin layer content is less than the lower limit of the aforementioned range. The rubbery copolymer acquires an unduly high modulus of elasticity with a conspicuous sacrifice of impact strength if the proportion exceeds the upper limit of the scope. The rigid resin has no particular restriction except for the requirement that it should be produced by the conventional method of emulsion polymerization. The rigid resins which are usable herein include methacrylic alkyl esters such as methyl methacrylate, ethyl methacrylate, and propyl methacrylate; aromatic vinyl compounds such as styrene and α-methyl styrene; and vinyl cyanide compounds such as acrylonitrile and methacrylonitrile. These monomers are capable of producing polymers of high glass transition points (Tg). These monomers may be used either singly or in the form of a combination of two or more members. Optionally, this rigid resin may be used in combination with a monomer such as, for example, methyl acrylate, ethyl acrylate, propyl acrylate, or butyl acrylate which is capable of producing a polymer of a low Tg on condition that the monomer is used in an amount not so large as to lower the Tg of the produced polymer.

The acrylic ester type cross-linked polymer layer as the second layer is formed for the purpose of imparting impact strength. The acrylic esters which are usable herein include acrylic alkyl esters having alkyl groups of 1 to 10 carbon atoms such as butyl acrylate, ethyl acrylate, and 2-ethylhexyl acrylate and aromatic acrylates such as benzyl acrylate, for example. These acrylic esters may be used either singly or in the form of a combination of at least two members. Optionally, this acrylic ester may be used in combination with other copolymerizable vinyl type monomer such as, for example, styrene, acrylonitrile, methacrylonitrile, methyl methacrylate, methacrylic acid, or acrylic acid. The cross-linking agent to be used in the acrylic ester type cross-linked polymer is a cross-linking monomer possessing at least two C=C bonds in the molecular unit thereof and having an ability to copolymerize with the acrylic ester. The cross-linking agents which satisfy the requirement include unsaturated acid esters of polyols such as ethylene glycol dimethacrylate; unsaturated alcohol esters of polybasic acids such as triallyl cyanurate and triallyl isocyanurate; and divinyl compounds such as divinyl benzene, for example. The content of the rubbery copolymer particles (first and second layers) in the multilayer graft copolymer particles V is required to be in the range of 30 to 80% by weight. The effect in imparting impact strength is not fully manifested if the content deviates from the range mentioned above.

The rubbery elastomer layer as the third layer is an intermediate layer to be interposed between the rubbery polymer particle consisting of the first and second layers and the fourth resin layer. It possesses an ability to improve the adhesiveness of the rubbery copolymer to the fourth layer. This third rubbery elastomer layer is required to comprise 20 to 80% by weight of an acrylic ester unit, 5 to 75% by weight of an aromatic vinyl compound unit, and 5 to 50% by weight of a vinyl cyanide unit. If the content of the acrylic ester unit is less than 20% by weight, the rubbery elastomer layer is deficient in adhesiveness to the acrylic ester type cross-linked polymer layer as the second layer and in impact strength. If this content exceeds 80% by weight, the rubbery elastomer layer is deficient in adhesiveness to the resin layer as the fourth layer and liable to lose in impact strength.

The rubbery elastomer layer can be formed by graft polymerizing a monomer mixture consisting of an acrylic ester, an aromatic vinyl compound, a vinyl cyanide compound, and a cross-linking agent to the rubbery copolymer particles comprising the first layer and the second layer. As the acrylic ester to be employed in this case, any of the concrete examples cited in the preceding paragraph describing the acrylic ester type cross-linked polymer layer as the second layer can be used. These acrylic esters may be used either singly or in the form of a combination of at least two members. The aromatic vinyl compounds which are usable herein include styrene, α-methyl styrene, vinyl toluene, t-butyl styrene, and styrene halogenides, for example. These aromatic vinyl compounds may be used either singly or in the form of a combination of at least two members. The vinyl cyanide compounds which are usable herein include acrylonitrile and methacrylonitrile, for example. They may be used either singly or in the form of a combination of at least two members.

As the cross-linking agent, any of the concrete examples cited in the preceding paragraph describing the second layer can be used. The amount of the cross-linking agent to be used is generally selected in the range of 0.05 to 5% by weight, based on the amount of the monomer mixture. The content of the third layer in the multilayer graft copolymer particles V is required to be in the range of 10 to 30% by weight.

The resin layer as the fourth layer in the multilayer graft copolymer particles is incorporated for the purpose of improving the compatibility with the copolymer I and is required to comprise 30 to 90% by weight of an aroamtic vinyl compound unit, 10 to 50% by weight of a vinyl cyanide unit, and not more than 20% by weight of an optionally incorporated acrylic ester unit. If the content of the acrylic ester unit exceeds 20% by weight, the resin layer is deficient in compatibility with the copolymer I and in impact strength.

The resin layer as the fourth layer can be formed by graft polymerizing a monomer mixture consisting of an aromatic vinyl compound, a vinyl cyanide compound, and an optionally incorporated acrylic ester to the rubbery copolymer particles having the third layer of rubbery elastomer formed thereon. In this case, as the aromatic vinyl compound and the vinyl cyanide compound, the concrete examples cited in the preceding paragraph describing the rubbery elastomer layer as the third layers are usable. As the acrylic ester, the concrete examples cited in the preceding paragraph describing the acrylic ester type cross-linked polymer layer as the second layer are usable. These monomers may be used either singly or in the form of a combination of at least two members. The content of the fourth layer in the multilayer graft copolymer particles V is required to be in the range of 10 to 40% by weight.

The multilayer graft copolymer particles V in the resin composition of the present invention is required to have an average particle diameter in the range of 0.2 to 0.8 μm. If this average particle diameter is less than 0.2 μm, the produced shaped article of the resin composition is deficient in impact strength in spite of fine surface gloss. If the average particle diameter exceeds 0 8 μm, the shaped article suffers from poor surface gloss in spite of high impact strength.

For the production of the multilayer graft copolymer particles, the method of emulsion polymerization which comprises polymerizing monomers in the presence of an emulsifier, a polymerization initiator, and a chain transfer agent and particularly the method of seed polymerization which comprises polymerizing monomers in the presence of a rigid resin destined to constitute the innermost layer under conditions for inhibiting new formation is advantageously used.

The emulsifiers which are usable herein include carboxylic acids having 2 to 22 carbon atoms; anionic emulsifiers such as sulfonates of alcohols or alkylphenols having 6 to 22 carbon atoms; nonionic emulsifiers having alkylene oxides added to aliphatic amines or amides; and cationic emulsifiers such as quaternary ammonium salt-containing compounds, for example. The polymerization initiators which are usable herein include water-soluble oxides such as alkali metal salts and ammonium salts of hydrogen peroxide and persulfuric acid; oil-soluble organic peroxides such as benzoyl peroxide and cumene hydroperoxide; and azo compounds such as azobisisobutyronitrile, for example. These polymerization initiators may be used either singly or in the form of a combination of at least two members. The redox catalysts which are usable herein include mixtures of reducing agents with peroxides such as alkali metal salts of hydrazine, bis-sulfite, thio-sulfite, and hydro-sulfite and mixtures of such reducing agents as soluble oxidizable sulfoxyl compounds with the aforementioned peroxides, for example. The chain transfer agents which are usable herein include alkyl mercaptans such as t-dodecyl mercaptan and toluene, xylene, chloroform, and halogenated hydrocarbons, for example.

As regards the manner of addition of monomers, though the monomers may be collectively added at once, it is advantageous to add the monomers as divided into several portions or to add the monomers continuously. By the method of split addition or continuous addition, the reaction of polymerization can be easily curbed and prevented from overheating and coagulation.

The formation of the rubbery elastomer layer as the third layer and the resin layer as the fourth layer may be effected by adding the monomer for the formation of the rubbery elastomer layer and the monomer for the formation of the resin layer and subjecting these monomers to sequential polymerization after completion of the polymerization reaction for the formation of the acrylic ester type cross-linked polymer layer as the second layer. Otherwise, this formation may be accomplished by adding the aromatic vinyl compound and the vinyl cyanide compound causing them to form the rubbery elastomer layer and the resin layer respectively while keeping the polymerization reaction for the formation of the acrylic ester type cross-linked polymer layer incomplete and allowing the unaltered monomers to persist.

For the control of the diameters of the multilayer graft copolymer particles, there may be used a method which comprises taking out part of a latex (seed latex) resulting from the polymerization of a rigid resin layer as the innermost layer, adding deionized water, an emulsifier, and monomers to the seed latex, and continuing seed polymerization and, during these steps, adjusting the amount of the seed latex to be taken out and curbing the number of particles in the seed latex.

A thermoplastic resin composition which excels in resistance to heat, resistance to chemicals, weatherability, resistance to impacts, flowability, and appearance is obtained by combining the multilayer graft copolymer particles V, the copolymer I, and optionally the copolymer II which are obtained as described above. As regards the contents of the components of the comosition, the copolymer I is required to account for a proportion in the range of 30 to 70% by weight, the multilayer graft copolymer particles V for a proportion in the range of 25 to 45% by weight, and the optionally incorporated copolymer II for a proportion of not more than 50% by weight. If the content of the copolymer I is less than 30% by weight, the produced composition is deficient in resistance to heat. If this content exceeds 70% by weight, the produced composition is deficient in resistance to impacts and flowability. If the content of the multilayer graft copolymer particles V is less than 25% by weight, the effect in improving resistance to impacts is not fully manifested. If this content exceeds 45% by weight, the composition is deficient in rigidity and resistance to heat. If the content of the copolymer II exceeds 50% by weight, the composition is deficient in resistance to heat.

The copolymers of this invention and the composition using them may incorporate therein hindered phenol, hindered amine, or trialkyl phosphite for the purpose of improving their lightfastness.

The copolymers of this invention and the composition using the copolymers may be used as combined with an inorganic filler (G) for the purpose of improving their resistance to heat and rigidity.

The copolymers of this invention and the composition using the copolymers allow glass fibers to manifest the effect of reinforcement very satisfactorily because they possess a maleimide group and a cyano group.

In the copolymers of this invention and the composition using them, glass fibers and glass flakes are usable as an inorganic filler (G) to be incorporated in the resin component. The glass fibers are required to possess an aspect ratio (L/D) of not less than 20 in the composition and diameters in the range of 5 to 15 $\mu$m The glass flakes are required, in the composition, to possess thicknesses in the range of 1 to 10 $\mu$m and lengths in the range of 10 to 500 $\mu$m. When the glass fibers or glass flakes possess dimensions deviating from the ranges mentioned above, the object of this invention is not fully accomplished.

The glass fibers and the glass flakes may be used independently or may be used as combined.

Though these glass fibers and glass flakes may be used in their unmodified form, they are used more desirably as treated in advance with a surface treating agent such as a coupling agent or treated in advance for bundling with a resin.

The surface treating agents which are usable herein include silane type, titanate type, aluminum type, chromium type, zirconium type, and borane type coupling agents, for example. Among other coupling agents mentioned above, the silane type coupling agents and the titanate type coupling agents prove to be desirable and the silane type coupling agents prove to be particularly desirable.

The kind of glass used for the glass fibers or glass flakes is not particularly limited. The materials which are usable herein include alkali-containing glass, low-alkali glass, and non-alkali glass, for example. The glass fibers may be roving, chopped strands, or milled fibers in form.

When glass fibers are used as the inorganic filler (G) in the composition of this invention, they are desired to be treated for bundling with a suitable resin. As this resin, a polymer latex possessing compatibility with the aforementioned resin is used. Generally, copolymer latexes consisting of an aromatic vinyl compound unit and a vinyl cyanide unit are usable for this purpose. The method used for this bundling treatment is not particularly limited. Any of the conventional methods popularly used for this purpose can be adopted. For example, a method which comprises applying the aforementioned latex to a glass-fiber mass formed of about 100 to 50,000 filaments by the technique of immersion coating, roller coating, spray painting, flow coating, or spray coating and thereafter drying the applied coating of the latex can be adopted.

The composition of this invention is required to incorporate the copolymers or the composition using them and the inorganic filler (G) in amounts such that the weight ratio thereof falls in the range of 1/9 to 4/6. If the proportion of the inorganic filler falls short of the lower limit of the range mentioned above, the produced composition is deficient in resistance to heat and mechanical properties. Conversely, if this proportion exceeds the upper limit of the range, the composition and the organic filler are not easily mixed and the produced mixture is deficient in moldability.

The composition of this invention may incorporate therein, as occasion demands, and only to the extent incapable of impairing the object of this invention, various additional components such as, for example, inorganic fillers represented by calcium carbonate, calcium sulfate, barium sulfate, aluminum hydroxide, talc, clay, mica, silica, diatomaceous earth, montmorillonite, bentonite, zinc borate, and barium metaborate and additives represented by antioxidant, lightproofing agent, slip additive, fire retardant, antistatic agent, and coloring agent.

The method for the production of the thermally stable impact-resistant resin composition of this invention is not specifically limited but may be selected from among the conventional methods popularly used for the manufacture of glass-fiber reinforced styrene type resin compositions. For example, the glass fiber roving obtained in consequence of the bundling treatment as described above may be extrusion coated with a resinous component by the use of an extruding device and the resultant strand pelletized by cutting. The strand of glass fibers which has undergone the bundling treatment may be cut in a suitable size to produce chopped strands. Otherwise, short glass fibers or glass flakes are mixed with a resinous component with a suitable mixing device such as, for example, a V blender, a ribbon blender, a Henschel mixer, or a tumbler blender and the resultant mixture may be optionally melted and stirred by the use of a suitable device such as, for example, a Banbury mixer, a kneader, an open roll, or a varying extruder, and subsequently subjected to pelletization.

The composition of this invention obtained as described above can be molded into an article of desired shape by various molding techniques such as, for example, injection molding, extrusion molding, and compression molding.

Further, the resin composition of this invention allows a polycarbonate to be used therein as melted and blended with the resin component thereof in a proportion such that the ratio of the polycarbonate to the resin component falls in the range of 1/9 to 9/1.

The polycarbonate resins which are advantageously usable in this invention are dihydroxydiallyl alkane type polycarboantes such as those polycarbonates which use 2,2-bis(4-hydroxydiphenyl)-propane(bisphenol A), for example, as a raw material.

BEST MODE OF EMBODYING THE INVENTION

Now, the present invention will be described more specifically below with reference to working examples.

The various physical properties mentioned in these working examples were determined by the following methods.

(1) Copolymer composition

This composition was determined by analysis for nitrogen content and N-NMR measurement.

(2) Acetone-insoluble content

This property was determined by dissolving a 3-g sample of copolymer in 27 g of acetone and visually examining the resultant solution as to the occurrence of an insoluble matter therein.

(3) Determination of molecular weight (Mw, Mn)

In the same manner as generally practised in the case of homopolystyrene, a sample was analyzed by gel permeation chromatography by the use of a high-speed liquid chromatographic device. The Mw and Mn of a sample were calculated by the use of calibration curves prepared in advance with standard polystyrene.

(4) Method for determination of composition distribution of copolymer I

A sample copolymer, about 100 mg in size, was weighed accurately, placed in a measuring flask 10 ml in volume, and dissolved with THF to a prescribed total volume. A prescribed volume (100 µl) of the resultant solution was poured in a GPC device and tested for molecular weight distribution. When the chart registering the results of measurement of the molecular weight began to show a peak, the fractions of the eluate taken at intervals of one minute were severally placed in sample vials. The contents of the sample vials, by the addition of a prescribed amount of KBr powder, were purged of THF through vaporization and subjected to infrared absorption by the technique of diffuse reflection.

The composition ratio of each of the fractions could be found by the use of a calibration curves prepared in advance by plotting the absorption intensities of CN group (2,237 cm$^{-1}$), C=O group (1,712 cm$^{-1}$), and benzene ring (760 cm$^{-1}$).

(5) Residual phenyl maleimide content

This property was determined by weighing 1.25 g of a sample copolymer in a 25-ml measuring flask, dissolving the sample copolymer with methylethyl ketone to a total volume of 25 ml, and subjecting the resultant solution to GC analysis to find the residual content of phenyl maleimide.

(6) Rubber particle diameter

This property was determined by preparing a calibration curve concerning the relation between latex particle diameters found by the technique using an electron microscope and the absorbance of a diluted solution of the latex(solid content 50 ppm) at a wavelength of 550 nm, measuring the absorbance of a given latex sample, and finding the particle diameter on the calibration curve with reference to the absorbance.

(7) Gel content (%) in multilayer graft copolymer particles (V)

This property was determined by immersing a sample in acetone 25 times as large in volume as the sample, shaking the sample in acetone for 2 hours, centrifuging the resultant mixture, and discarding the supernatant, repeating this procedure two more times, drying the final residue of centrifugation, and finding the gravimetric percentage ratio of the dried residue and the sample originally offered.

(8) Physical properties

The following physical properties were determined in accordance with the methods indicated correspondingly with necessary modifications.

| | |
|---|---|
| Cloudiness: | ASTM D1746 |
| Temperature of heat distortion: | ASTM D648 ($\frac{1}{4}$. under a load of 18.6 kg/cm$^2$) |
| Tensile strength: | ASTM D638 |
| Flexural strength: | ASTM D790 |
| Modulus of bending elasticity: | ASTM D790 |
| Tensile elongation: | ASTM D638 |
| Izod impact strength: | ASTM D256 |
| MI: | JIS (Japanese Industrial Standard) K7210 (250° C., under a load of 10 kg) |
| Gloss: | ASTM D253 |

EXAMPLE 1

Polymerization of copolymer I

A mixed solution consisting of 36 parts by weight of styrene, 14 parts by weight of acrylonitrile, 20 parts by weight of N-phenyl maleimide, 30 parts by weight of ethyl benzene, and 0.02 part by weight of t-butyl peroxyisopropyl carbonate was continuously supplied at a flow volume of 1.26 liters/hr to a polyemrization tank formed by having a complete mixing reaction vessel 1.9 liters in reaction volume and three laminar reaction vessels 0.5 liter in reaction volume arranged in series. To the upstream part of the second laminar flow reaction vessel, 10 parts by weight of styrene was added for mixture with the mixed solution. The temperature of the complete mixing reaction vessel was 109° C. and the temperatures of the laminar flow reaction vessels were 110° to 140° C.

The concentrations of residual phenyl maleimide in the portions of the reaction solution at the outlets of the reaction vessels were 6.0%, 0.35%, 0.025%, and 0.0018%.

Then, the polymer solution having a solids content of 50% by weight was heated to 265° C. and, at the same time, introduced into a vacuum chamber 20 meters in length, and subjected to 15 minutes' vaporization for expulsion of volatile component. The molten polymer was taken out and solidified by cooling.

The composition of the mixed solution supplied is shown in Table 1 and the composition distribution of each of the fractions divided by molecular weight is shown in Table 2 and the composition of the produced copolymer and the physical properties thereof are shown in Table 4.

The composition distribution was as shown in Table 2. Examples 2 to 4 and Comparative Experiments 1 and 2:

The results shown in Table 2 and Table 4 were obtained in experiments performed by following the procedure of Example 1, excepting the compositions of monomers were varied as shown in Table 1.

TABLE 1

|  | Example | | | | Comparative Example | |
|---|---|---|---|---|---|---|
|  | 1 | 2 | 3 | 4 | 1 | 2 |
| Feed composition | | | | | | |
| ST | 36 | 34.1 | 33.2 | 34 | 30 | 42 |
| AN | 14 | 16 | 17.4 | 12.3 | 16 | 18 |
| PMI | 20 | 18.5 | 18 | 22 | 19 | 10 |
| EB | 30 | 31.4 | 31.4 | 31.7 | 35 | 30 |
| PBi | 0.02 | 0.010 | 0.02 | 0.014 | 0.02 | 0.02 |

ST: styrene
AN: acrylonitrile
PMI: phenyl maleimide
EB: ethyl benzene
PBi: t-butyl peroxyisopropyl carbonate

TABLE 2

| Mw × 10$^{-4}$ | component unit of the molecular chain | copolymer composition (wt. %) Example | | | |
|---|---|---|---|---|---|
|  |  | 1 | 2 | 3 | 4 |
| 5 | AN | 20 | 21 | 27 | 19 |
|  | ST | 50 | 49 | 45 | 50 |
|  | PMI | 30 | 30 | 28 | 31 |
| 10 | AN | 20 | 21 | 27 | 19 |
|  | ST | 50 | 49 | 45 | 50 |
|  | PMI | 30 | 30 | 28 | 31 |
| 15 | AN | 16 | 17 | 23 | 15 |
|  | ST | 50 | 50 | 46 | 50 |
|  | PMI | 34 | 33 | 31 | 35 |
| 20 | AN | 17 | 17 | 23 | 15 |
|  | ST | 50 | 50 | 46 | 50 |
|  | PMI | 33 | 33 | 31 | 35 |

COMPARATIVE EXPERIMENT 3

In a reaction device having an inner volume of 60 liters, 30 liters of an aqueous solution consisting of 0.05 part by weight of sodium dioctylsulfosuccinate, 0.02 part by weight of ammonium persulfate, and 200 parts by weight of water was placed and the inner temperature of the reaction device was controlled at 60° C.

To the reaction device, 100 parts by weight of monomers consisting of 15% by weight of acrylonitrile, 54.8% by weight of styrene, 30% by weight of phenyl maleimide, and 0.20% by weight of t-dodecyl mercaptan was added, then subjected to 2 hours' polymerization at 55° C., and given 6 hours' continued polymerization at 70° C. The conversion was 96%.

The composition distribution of each of the fractions divided by molecular weight was as shown in Table 3. The composition of copolymers and the physical properties thereof were as shown in Table 4.

TABLE 3

| MW × 10$^{-4}$ | Component units of molecular chain (% by weight) | | |
|---|---|---|---|
|  | AN | ST | NPMI |
| 5 | 14.5 | 48.3 | 37.2 |
| 10 | 16.2 | 56.7 | 27.1 |
| 15 | 17.4 | 54.5 | 28.1 |
| 20 | 18.3 | 55.6 | 26.1 |

COMPARATIVE EXPERIMENT 4

A mixed solution consisting of 36 parts by weight of styrene, 14 parts by weight of acrylonitrile, 20 parts by weight of N-phenyl maleimide, 30 parts by weight of ethyl benzene, and 0.02 part by weight of t-butylperoxyisopropyl carbonate was continuously supplied for polymerization at a feed volume of 1.26 liters/hr to a complete mixing reaction vessel 1.9 liters in reaction volume. The temperature of the complete mixing reaction vessel was 109° C.

Then, the resultant polymer solution having a solids content of 50% by weight was heated to 265° C. and, at the same time, introduced into a vacuum chamber 10 meters in length, and subjected to 30 minutes' vaporization for expulsion of the volatile content. The residual maleimide monomer content in the copolymer was 2,325 ppm.

The composition distribution of the copolymer as uniform as in that of the copolymer of Example 1.

The composition of copolymers and the physical properties thereof were as shown in Table 4.

COMPARATIVE EXPERIMENT 5

Polymerization was carried out by following the procedure of Comparative Experiment 4, excepting the composition of monomers fed to the reaction vessel was changed to that which consisted of 50 parts by weight of styrene, 16 parts by weight of acrylonitrile, 40 parts by weight of N-phenyl maleimide, and 30 parts by weight of ethyl benzene. The composition of copolymers and the physical properties thereof were as shown in Table 4.

TABLE 4

| | | Example | | | | Comparative Experiment | | | | |
|---|---|---|---|---|---|---|---|---|---|---|
| | | 1 | 2 | 3 | 4 | 1 | 2 | 3 | 4 | 5 |
| Copolymer | Styrene unit | 50 | 50 | 45 | 51 | 51 | 58 | 54 | 50 | 70 |
| composition | Acrylonitrile unit | 17 | 18 | 24 | 15 | 19 | 24 | 18 | 15 | 23 |
| (% by weight) | N-phenyl maleimide | 33 | 32 | 31 | 34 | 40 | 18 | 28 | 34 | 7 |

TABLE 4-continued

|  | Example | | | | Comparative Experiment | | | | |
|---|---|---|---|---|---|---|---|---|---|
| unit | 1 | 2 | 3 | 4 | 1 | 2 | 3 | 4 | 5 |
| Acetone-insoluble content | none | none | none | none | none | none | some | none | none |
| Residual N-phenyl maleimide content (% by weight) | 0.002 | 0.002 | 0.002 | 0.002 | 0.003 | 0.003 | 0.007 | 0.230 | 0.06 |
| Molecular weight $Mw \times 10^4$ | 18.5 | 13.8 | 13.0 | 14.2 | 8.2 | 17.3 | 18.0 | 17.5 | 19.0 |
| $Mn \times 10^4$ | 9.4 | 6.9 | 6.1 | 6.8 | 4.1 | 7.8 | 8.5 | 8.8 | 9.5 |
| Cloudiness (%) | 2.1 | 2.1 | 2.2 | 2.2 | 2.3 | 2.1 | 5.5 | 3.1 | 2.1 |
| Temperature of heat distortion (°C.) | 138 | 138 | 136 | 136 | 134 | 115 | 130 | 134 | 106 |
| Tensile strength (Kg/cm) | 670 | 650 | 640 | 560 | 370 | 794 | 450 | 640 | 680 |
| Flexural strength (Kg/cm) | 920 | 870 | 930 | 880 | 720 | 980 | 730 | 850 | 1000 |
| Modulus of bending elasticity (kg/cm) | 39800 | 41700 | 42300 | 39600 | 39200 | 39900 | 39800 | 38000 | 40000 |
| Moldability *1 | ◯ | ◯ | ◯ | ◯ | ◯ | ◯ | ◯ | XX | Δ |

Moldability: This property was rated by the two-point scale, wherein XX stands for difficulty experienced during the course of injection molding owing to adhesion of oligomer and residual phenyl maleimide to the molding die and ◯ for perfectly safe continuous molding.

EXAMPLE 5

Polymerization of copolymer I

A copolymer I was obtained by following the procedure of Example 1.

Polymerization of copolymer II

A copolymer II was obtained by polymerizing a monomer mixture consisting of 30% by weight of acrylonitrile and 70% by weight of styrene in the same manner as in Example 1.

The molecular weight distribution and the composition distribution of the copolymer II were such that the molecular weight of the copolymer II as reduced to polystyrene was Mw=100,000 and Mw/Mn=1.9.

Resin composition

Pellets were obtained by melting and blending 50% by weight of the copolymer I and 50% by weight of the copolymer II by the use of a PCM extruding device 45 mm in diameter.

A test piece obtained by injection molding the pellets was evaluated. The results were as shown in Table 5.

EXAMPLES 6 to 8

Resins were produced by following the procedure of Example 5, using the copolymers of Examples 2 to 4 each as Copolymer I and copolymers of compositions varied as indicated in Table 5 each as Copolymer II. The resins were evaluated in the same manner as in Example 5. The results were as shown in Table 5.

TABLE 5

|  |  | 5 | 6 | 7 | 8 |
|---|---|---|---|---|---|
| Composition of copolymer (I) (% by weight) | ST | 50 | 50 | 45 | 51 |
| | AN | 17 | 18 | 24 | 15 |
| | PMI | 33 | 32 | 31 | 34 |
| Amount used (% by weight) | | 50 | 70 | 30 | 40 |
| Composition of copolymer (II) (% by weight) | ST | 80 | 65 | 60 | 60 |
| | AN | 20 | 35 | 40 | 40 |
| | $Mw \times 10^{-4}$ | 10 | 15 | 15 | 8 |
| Amount used (% by weight) | | 50 | 30 | 70 | 60 |
| MI 108/10 min. | | 32 | 13 | 64 | 52 |
| Property of heat distortion | VSP | 137 | 139 | 132 | 134 |
| | HDT | 113 | 120 | 108 | 110 |
| Transparency | | Good | Good | Good | Good |

EXAMPLE 9

Polymerization of copolymer I

A copolymer I was obtained by following the procedure of Example 1.

Polymerization of copolymer II

A copolymer II was obtained by following the procedure of Example 5.

Polymerization of copolymer III

In a reaction vessel having an inner volume of 60 liters, 30 liters of an aqueous solution consisting of 40 parts by weight of butadiene rubber (polybutadiene latex having a particle diameter of 3,000 Å, produced by the Nippon Zeon Co., Ltd.), 0.05 part by weight of sodium dihexylsulfosuccinate, 0.02 part by weight of ammonium persulfate, and 200 parts by weight of water was placed and the interior temperature of the reaction vessel was controlled at 75° C.

To the reaction vessel, 40 parts by weight of monomers consisting of 35% by weight of acrylonitrile, 55% by weight of styrene, and 10% by weight of N-phenyl maleimide was continuously added for 2 hours at 55° C. After completion of this addition, the ensuant polymerization was continued for 6 hours. The conversion was 96%.

Resin composition

By the use of a PCM extruding device 45 mm in diameter (produced by Ikegai Iron Works, Ltd.), 55 parts by weight of the copolymer I, 10 parts by weight of the copolymer II, 35 parts by weight of the copolymer III, and 0.3 part by weight of a combination dye-pigment composed of titanium oxide, red dyestuffs of the perinone type and anthraquinone type, and a yellow dyestuff of the heterocyclic type were melted and kneaded at 260° C. to obtain pellets.

Test pieces for determination of physical properties were obtained by molding the pellets with an injection molding device.

When one such test piece was heated at 110° C. for 2 hours, it sustained no discoloration due to the heat.

When another test piece was immersed in gasoline at 20° C. for 48 hours, it offered highly satisfactory resistance to gasoline and showed no change in appearance.

When yet another test piece was coated with an acrylic type coating material, the formed coating possessed a highly satisfactory flat and smooth surface and reflected a projected image very clearly.

The results were as shown in Table 6.

EXAMPLES 10 TO 13

Resin compositions were obtained by following the procedure of Example 9, excepting the compositions of the copolymer I, the copolymer II, and the copolymer IV and the amounts thereof to be used were varied as shown in Table 6. These resin compositions were evaluated in the same manner as in Example 9. The results were as shown in Table 6.

sion coating by the use of an extruding device and cutting the resultant strand.

The results were as shown in Table 7.

EXAMPLES 16 AND 17

TABLE 6

|  |  | 9 | 10 | 11 | 12 | 13 |
|---|---|---|---|---|---|---|
| Composition of | ST | 50 | 55 | 55 | 47 | 56 |
| copolymer (I) | AN | 17 | 15 | 15 | 18 | 17 |
| (% by weight) | PMI | 33 | 35 | 35 | 45 | 27 |
| Amount used (% by weight) | | 55 | 55 | 30 | 40 | 40 |
| Composition of | ST | 60 | 60 | 60 | 70 | 73 |
| copolymer (II) | AN | 40 | 40 | 40 | 30 | 27 |
| (% by weight) | | | | | | |
| Amount used (% by weight) | | 10 | 10 | 30 | 25 | 25 |
| Composition of | Rubber | 40 | 40 | 40 | 40 | 40 |
| copolymer (III) | ST | 33 | 36 | 36 | 36 | 36 |
| or (IV) | AN | 21 | 24 | 24 | 24 | 24 |
| (% by weight) | PMI | 6 | — | — | — | — |
| Amount used (% by weight) | | 35 | 35 | 35 | 35 | 35 |
| MI (g/10 minutes) | | 6.6 | 7.2 | 25 | 9.0 | 25 |
| Temperature of heat distortion, HDT (°C.) | | 115 | 114 | 102 | 112 | 102 |
| Izod impact strength (kg · cm/cm) | | 12 | 12 | 15 | 13 | 15 |
| Weatherability [1] | | Good | Good | Good | Good | Good |

Note [1] This property was determined by subjecting a test piece to a 2000 hours. exposure test at 63° C. by the use of a Sunshine weather-o-meter and visually inspecting test piece as to the appearance.

EXAMPLE 14

Polymerization of copolymer III, (butyl acrylate graft copolymer)

Ordinary emulsion polymerization was performed at 75° C., using for the first-step polymerization 10% by weight of a monomer mixture consisting of 80 parts by weight of methyl methacrylate and 20 parts by weight of butyl acrylate, for the second-step polymerization 63% by weight of a monomer mixture consisting of 99 parts by weight of butyl acrylate and 1.0 part by weight of triallyl isocyanurate, and for the third-step polymerization 27% by weight of a monomer mixture consisting of 40 parts by weight of acrylonitrile and 60 parts by weight of styrene. The conversion was 97%.

Pellets were obtained by following the procedure of Example 10, excepting the copolymer obtained by the emulsion polymerization was used instead.

The resin was found to possess an MI of 6.0 g/10 minutes, an HDT of 113° C., and an Izod of 14 kg/cm/cm.

A test piece of the resin was subjected to a 2000 hours' exposure test at 63° C. by the use of a Sunshine weather-o-meter. At the end of the test, the test pice showed virtually no change in appearance.

EXAMPLE 15

Polymerization of copolymer I

A copolymer I was obtained by following the procedure of Example 1.

Treatment for bundling glass fibers

A roving of 500 to 20,000 glass fibers was immersed in an aqueous emulsion of a copolymer consisting of 25% by weigt of acrylonitrile unit and 75% by weight of styrene unit and then dried by way of a bundling treatment.

Resin composition

GF-reinforced pellets were prepared by subjecting 80% by weight of the copolymer I and 20% by weight of the glass fibers treated as described above to extru- The results shown in Table 7 were obtained by subjecting the resin compositions shown in Table 7 and the glass fibers produced and treated as described in Example 15 to extrusion coating.

TABLE 7

|  |  | 15 | 16 | 17 |
|---|---|---|---|---|
| Composition of | ST | 50 | 55 | 55 |
| copolymer (I) | AN | 17 | 15 | 15 |
| (% by weight) | PMI | 33 | 35 | 35 |
| Amount used (% by weight) | | 80 | 44 | 16 |
| Composition of | ST | — | 60 | 60 |
| copolymer (II) | AN | — | 40 | 40 |
| (% by weight) | | | | |
| Amount used (% by weight) | | — | 8 | 36 |
| Composition of | Rubber | — | 40 | 40 |
| copolymer (III) | ST | — | 36 | 36 |
| or (IV) | AN | — | 24 | 24 |
| (% by weight) | PMI | — | — | — |
| Amount used (% by weight) | | — | 28 | 28 |
| Glass fibers (parts by weight) | | 20 | 20 | 20 |
| MFR[1] (g/10 minutes) | | 1.2 | 0.5 | 2.5 |
| Tensile strength (kg/cm$^2$) | | 800 | 1110 | 1100 |
| Elongation (%) | | 2 | 3.5 | 4.0 |
| Flexural strength (kg/cm$^2$) | | 1260 | 1590 | 1500 |
| Izod impact strength (kg · cm/cm) | | 12 | 11 | 11 |
| Temperature of heat distortion (°C.) | | 149 | 127 | 117 |
| State of dispersion of glass fibers[2] | | Good | Good | Good |

Note [1] MFR: This property was determined under the conditions of 250° C. and 10 kg of load.
[2] This property was determined by visual observation of injection molded piece.

EXAMPLE 18

By the use of a PCM extruding device 45 mm in diameter, 10 parts by weight of the copolymer of Example 1, 20 parts by weight of the copolymer II of Example 5, 20 parts by weight of the copolymer III of Example 9, and 50 parts by weight of a polycarbonate (produced by Mitsubishi Chemical Industries, Ltd. and marketed under trademark designation of "Novalex 7035A") were blended and extrusion kneaded.

The resultant resin composition was found to possess an MFR of 8.4 g/10 min at 250° C. under a load of 10 kg, an Izod impact strength of 11.7 kg-cm/cm, a temperature of heat distortion of 124° C., and a modulus of bending elasticity of 2,600 kg/cm².

EXAMPLE 19

Production of multilayer graft copolymer particles V (1) Production of innermost rigid resin layer (first layer)
First-step seed polymerization In a reaction vessel, 248.3 parts by weight of deionized water and 0.05 parts by weight of sodium dihexylsulfosuccinate were stirred and, at the same time, the entrapped air was thoroughly displaced with nitrogen and subsequently the inner temperature was heated to and maintained at 75° C. To this reaction vessel, 0.02 parts by weight of ammonium persulfate was added and a mixture consisting of 8 parts by weight of methyl methacrylate and 2 parts by weight of butyl acrylate was continuously added over a period of 50 minutes. After the addition, the resultant mixture and 0.01 part by weight of ammonium persulfate further added thereto were left reacting at 75° C. for 45 minutes. The conversion was 99%. The particle diameter of the resultant latex was 0.17 μm.

Second-step seed polymerization
Then, one fourth of the latex (2.5 parts by weight as solids) was taken out of the reaction vessel. The reaction vessel was additionally charged with 186.2 parts by weight of deionized water and 0.03 parts by weight of sodium dihexylsulfossucinate. The contents of the reaction vessel were stirred and, at the same time, the entrapped air was displaced thoroughly with nitrogen and subsequently the inner temperature of the reaction vessel was heated to 75° C. To this reaction vessel, 0.02 part by weight of ammonium persulfate was added and a mixture consisting of 6.0 parts by weight of methyl methacrylate and 1.5 parts by weight of butyl acrylate was continuously added over a period of 50 minutes. After the addition, the ensuant reaction was continued at 75° C. for 45 minutes to complete the reaction. The conversion was 98% and the particle diameter of the produced latex was 0.28 μm.

(2) Production of acrylic ester type cross-linked polymer layer (second layer)

To the latex containing rigid resin particles and produced in (1), 0.01 part by weight of ammonium persulfate and 0.05 part by weight of sodium dihexylsulfosuccinate were added and then a mixture consisting of 63 parts by weight of butyl acrylate and 1.2 parts by weight of triallyl isocyanurate as a cross-linking agent was continuously added at 70° C. over a period of 80 minutes. After completion of the addition, the ensuant reaction was continued at 70° C. for 20 minutes. The overall conversion in the first and second layers was 85% and the particle diameter of the finally obtained latex was 0.41 μm.

(3) Production of rubbery elastomer layer (third layer)

After completion of the step (2) described above, to the unaltered monomers, i.e. 11 parts by weight of butyl acrylate and 0.18 part by weight of triallyl isocyanurate, 0.045 part by weight of ammonium persulfate and 0.45 part by weight of sodium dihexylsulfosuccinate were added and then a mixture consisting of 3.8 parts by weight of acrylonitrile, 11.4 parts by weight of styrene, and 0.025 part by weight of t-dodecyl mercaptan was continuously added at 75° C. over a period of 90 minutes. The conversion was 93%. By analyzing the produced latex for residual monomer contents by gas chromatography and calculating the composition ratio of the three-layer copolymer, the gravimetric ratio of the acrylonitrile unit/styrene unit/butyl acrylate unit was found to be 10/43/47.

(4) Production of resin layer (fourth layer)

To the latex obtained in the step (3), a mixture consisting of 2.95 parts by weight of acrylonitrile, 8.86 parts by weight of styrene, and 0.02 part by weight of t-dodecyl mercaptan was continuously added at 75° C. over a period of 70 minutes. The ensuant reaction was continued at 85° C. for 1 hour to complete the reaction. The conversion was 97%. The particle diameter of the resultant latex was 0.56 μm. By analyzing the latex for residual monomer contents by gas chromatography and calculating the composition ratio of the four-layer copolymer, the gravimetric ratio of acrylonitrile unit/styrene unit/butyl acrylate unit was found to be 24/65/11.

The latex obtained as described above was salted out by the conventional method using aluminum sulfate and the resultant precipitate was dried, to produce multilayer graft copolymer particles V.

Preparation of composition and evaluation

The copolymer I obtained in Example 1 and the multilayer graft copolymer particles V obtained as described above were mechanically mixed in proportions such that the amount of the butyl acrylate unit in the multilayer graft copolymer particles V would account for a proportion of 22% by weight to the total weight of the composition (the gravimetric ratio of multilayer graft copolymer particles V/copolymer I 35/65). The resultant mixture was kneaded and pelletized at 250° C. with a melt extruding device.

Various test pieces were formed of the pellets with an injection molding device and were used for evaluation of various physical properties. The results are shown in Table 9. The composition, gel content (%), and particle diameter of the multilayer graft copolymer V are shown in Table 8.

It is clearly noted from Table 8 and Table 9 that the resin composition of this invention possesses high impact strength and a highly satisfactory appearance.

EXAMPLE 20

The copolymer I obtained in Example 1, the multilayer graft copolymer V obtained in Example 19, and the copolymer II obtained in Example 5 were mechanically mixed in a gravimetric ratio of 55/35/10. The resultant mixture was kneaded and pelletized at 250° C. with a melt extruding device. Various test pieces were formed of the pellets with an injection molding device and used for evaluation of physical properties. The results are shown in Table 9.

COMPARATIVE EXPERIMENT 6

Production of multilayer graft copolymer particles V (1) Production of innermost rigid resin layer (first layer)
This layer was produced by faithfully following the procedure of Example 19 (1).

(2) Production of acrylic ester type cross-linked polymer layer (second layer)

To the latex obtained in the step (1) above, 0.13 part by weight of ammonium persulfate and 0.05 part by weight of sodium dihexylsulfosuccinate were added and then a mixture consisting of 63 parts by weight of butyl acrylate and 1.2 parts by weight of triallyl isocyanurate as a cross-linking agent was continuously added at 80° C. over a period of 80 minutes. After completion of the bery elastomer layer have a low gel content (%) and a low Izod impact strength.

TABLE 8

| | Gravimetric ratio of component layers | | | | first layer | | second layer | third layer | | | fourth layer | | | Gel content (%) | Particle diameter (μm) |
|---|---|---|---|---|---|---|---|---|---|---|---|---|---|---|---|
| | layer 1 | layer 2 | layer 3 | layer 4 | MMA | BA | BA | AN | ST | BA | AN | ST | BA | | |
| Example 19 | 10 | 52 | 21 | 17 | 80 | 20 | 100 | 10 | 43 | 47 | 24 | 65 | 11 | 98.7 | 0.56 |
| Comparative Example 6 | 10 | 63 | 0 | 27 | 80 | 20 | 100 | 0 | 0 | 0 | 25 | 75 | 0 | 89.5 | 0.55 |

Note: MMA for methyl methacrylate, BA for butyl acrylate, AN for acrylonitrile, and ST for styrene

TABLE 9

| | Izod impact strength (kg · cm/cm) | | Tensile strength (kg/cm$^2$) | Elongation (%) | Flexural strength (kg/cm$^2$) | Modulus of bending elasticity (kg/cm$^2$) | Gloss (%) |
|---|---|---|---|---|---|---|---|
| | 23° C. | −30° C. | | | | | |
| Example 19 | 11.0 | 5.9 | 510 | 5 | 740 | 22500 | 94 |
| Example 20 | 11.3 | 6.0 | 510 | 6 | 730 | 23200 | 90 |
| Comparative Example 6 | 4.5 | 3.9 | 450 | 4 | 730 | 22200 | 93 | addition, the ensuant reaction was continued at 80° C. for 90 minutes. The overall conversion in the first and second layers was 99.5% and the particle diameter of the latex was 0.41 μm.

(3) Production of resin layer

To the latex obtained in the step (2) above, 0.045 part by weight of ammonium persulfate and 0.45 part by weight of sodium dihexylsulfosuccinate were added and then a mixture consisting of 6.75 parts by weight of acrylonitrile, 20.25 parts by weight of styrene, and 0.045 part by weight of t-dodecyl mercaptan was continuously added at 75° C. over a period of 160 minutes. The ensuant reaction was continued at 85° C. for 1 hour to complete the reaction. The conversion was 98% and the particle diameter of the latex was 0.55 μm.

By analyzing the latex for residual monomer contents by gas chromatography and calculating the composition ratio of copolymer of the resin layer, the gravimetric ratio of acrylonitrile unit/styrene unit/butyl acrylate unit was found to be 25/75/0.

The latex obtained as described above was treated in the same manner as in Example 19 and evaluated. The results are shown in Table 8.

Preparation of composition and evaluation

Pellets were obtained by following the procedure of Example 19, excepting the multilayer graft copolymer particles V described above were used instead. Test pieces were formed of the pellets and used for evaluation of physical properties. The results are shown in Table 9.

It is clearly noted from Table 8 and Table 9 that the multilayer graft copolymer particles devoid of a rub-

COMPARATIVE EXPERIMENT 7

An experiment was carried out by following the procedure of Example 19, excepting the use of triallyl isocyanurate as a cross linking agent was omitted in the production of the acrylic ester type cross-linked polymer layer (second layer) of the step (2) for the production of the multilayer graft copolymer particles V.

The results are shown in Table 10.

It is clearly noted from Table 10 that the composition obtained without use of triallyl isocyanurate is conspicuously inferior in impact strength and other mechanical properties to the countertype obtained by the procedure of Example 19.

COMPARATIVE EXPERIMENT 8

An experiment was carried out by following the procedure of Example 19, excepting 1.2 parts by weight of allyl methacrylate was used as a grafting agent in the place of triallyl isocyanurate as a cross-linking agent in the production of the acrylic ester type cross-linked polymer layer (second layer) of the step (2) for the production of the multilayer graft copolymer particles V.

The results are shown in Table 10.

It is clearly noted from Table 10 that the composition obtained by using allyl methacrylate as a grafting agent in the place of triallyl isocyanurate as a cross-linking agent was inferior in impact strength to the countertype obtained by the procedure of Example 19.

TABLE 10

| | Izod impact strength (kg · cm/cm) | | Tensile strength (kg/cm$^2$) | Elongation (%) | Flexural strength (kg/cm$^2$) | Modulus of bending elasticity (kg/cm$^2$) | Gloss (%) |
|---|---|---|---|---|---|---|---|
| | 23° C. | −30° C. | | | | | |
| Example 19 | 11.0 | 5.9 | 510 | 5 | 740 | 22500 | 94 |
| Comparative Example 7 | 2.1 | 0.6 | 340 | 2 | 580 | 14000 | 77 |
| Comparative Example 8 | 4.8 | 1.8 | 410 | 2 | 650 | 15100 | 87 |

EXAMPLES 21 TO 23 AND COMPARATIVE EXPERIMENTS 9 AND 10

Experiments were carried out by following the procedure of Example 19, excepting the amount of removal of the latex obtained in the first-step seed polymerization of the innermost rigid resin (first layer) was decreased to varying extents and the seed polymerization was continued to control the final particle diameter to varying sizes in the range of 0.56 to 0.85 μm. The amount of sodium dihexylsulfosuccinate in the first-step seed polymerization mentioned above was increased and the seed polymerization was continued to control the final particle diameter to varying sizes in the range of 0.56 to 0.16μm.

The latex obtained as described above was treated in the same manner as in Example 19 to obtain multilayer graft copolymer particles V. A composition was formed of these copolymer particles V and then evaluated in the same manner as in Example 19. The results are shown in Table 11.

It is clearly noted from Table 11 that compositions formed of multilayer graft copolymer particles less than 0.2 μm in diameter are excellent in gloss but inferior in impact strength and compositions formed of multilayer graft copolymer particles exceeding 0.80 μm in diameter are excellent in impact strength but inferior in gloss.

TABLE 11

|  | Examples | | | Comparative Examples | |
|---|---|---|---|---|---|
|  | 21 | 22 | 23 | 9 | 10 |
| Particle diameter (μm) of multilayer graft copolymer particles | 0.30 | 0.56 | 0.70 | 0.16 | 0.8 |
| Composition | | | | | |
| Izod impact strength (23° C., ¼. kg· cm/cm) | 8.3 | 11.0 | 12.0 | 4.4 | 12.6 |
| Gloss (%) | 96 | 94 | 91 | 98 | 82 |

COMPARATIVE EXPERIMENTS 11 AND 12

A composition (Comparative experiment 12) produced by following the procedure of Example 19 using an acrylonitrilestyrene copolymer (produced by Asahi Chemical Industry Co., Ltd. and marketed under trademark designation of "Stylac AS-783") in the place of a matric resin as the copolymer I, a composition (Comparative Experiment 13) similarly produced using an ABS resin (produced by Asahi Chemical Industry Co., Ltd. and marketed under trademark designation of "Stylac ABS"), and the compositions of Examples 19 and 20 were tested for temperature of heat distortion in accordance with the method of ASTM D648 with necessary modifications. They were also subjected to an accelerated weathering test by the use of a dew panel light-control weather meter. The results are shown in Table 12.

It is clearly noted from Table 12 that the resin comositions conforming to the present invention are superior in resistance to heat and weatherability than the resin compositions of the comparative example.

TABLE 12

|  | Temperature of heat distortion (°C.) | Izod impact strength (23° C., kg · cm/cm) (1) | | | |
|---|---|---|---|---|---|
|  |  | At start | 10 day's exposure | 20 day's exposure | ratio of retension (%) |
| Example 19 | 120.2 | 11.0 | 10.6 | 10.0 | 91 |
| Example 20 | 115.0 | 11.3 | 10.9 | 10.3 | 91 |
| Comparative Example 11 | 85.6 | 21.4 | 20.8 | 19.5 | 91 |
| Comparative Example 12 | 83.5 | 30.0 | 15.5 | 9.6 | 32 |

Note (1) The accelerated weathering test was carried out by repeating a cycle consisting of exposure to weather conditions at 60° C. by the use of a dew panel light-control weather meter (produced by Suga Shikenki K.K. and marketed under product code of DPWL-5) and dew formation by wetting at 40° C.

EXAMPLE 24

By the use of an extruding device, 80 parts by weight of the composition obtained in Example 19 and 20 parts by weight of the glass fibers subjected to the bundling treatment in the same manner as in Example 15 were subjected to extrusion coating. The strand consequently obtained was cut, to produce GF-reinforced pellets.

Then, test pieces for evaluation of physical properties were formed of the pellets by the use of an injection molding device and were evaluated for physical properties.

The resin composition was found to possess a tensile strength of 1,110 kg/cm$^2$, an elongation of 4%, a flexural strength of 1,480 kg/cm$^2$, an Izod impact strength of 13.6 kg.cm/cm, and a temperature of heat distortion of 137° C.

ECONOMIC UTILITY OF THE INVENTION

The shaped articles of plastics obtained by the present invention find favorable unitility in automobile interior parts, specifically console boxes, speaker boxes, instrument panels, and air spoilers and in electrical parts, specifically housings and chasses for word processors and personal computers.

What is claimed is:

1. A method for the production of a thermoplastic copolymer comprising the following components:
   an aromatic vinyl compound unit in an amount of 30–70% by weight,
   an acrylonitrile or methacrylonitrile unit in an amount of 4–40% by weight, and
   an N-substituted maleimide unit in an amount of 26–50% by weight of the thermoplastic copolymer;
   wherein the content of each of the components in each molecular weight fraction of the thermoplastic copolymer is 80–120% of the content of the components in said thermoplastic copolymer, said thermoplastic copolymer having substantially no acetone-insoluble content, having a weight average molecular weight of not less than 100,000 and not more than 300,000 and a number average molecular weight of not less than 50,000 and not more than 150,000, and having a residual N-substituted maleimide monomer content of not more than 50 ppm in the copolymer, which comprises copolymerizing a monomer mixture comprising 30 to 90% by weight of an aromatic vinyl compound, 4 to 40% by weight of acrylonitrile or methacrylonitrile, and 5 to 50% by weight of an N-substituted maleimide by continuous solution polymerization in a complete mixing type reaction vessel and a laminar flow reaction vessel arranged in series, wherein not less than 30% by weight of the monomer mixture is copolymerized in the complete mixing type reaction vessel and not less than 50% by weight of the monomer mixture is copolymerized in the laminar flow reaction vessel.

* * * * *